United States Patent [19]
Jones et al.

[11] Patent Number: 5,440,634
[45] Date of Patent: Aug. 8, 1995

[54] VALUE TRANSFER SYSTEM

[75] Inventors: Timothy L. Jones, Hove; Graham R. Higgins, Bath, both of England

[73] Assignee: Jonhig Limited, London, United Kingdom

[21] Appl. No.: 75,567

[22] PCT Filed: Oct. 16, 1992

[86] PCT No.: PCT/GB92/01901
§ 371 Date: Aug. 16, 1993
§ 102(e) Date: Aug. 16, 1993

[87] PCT Pub. No.: WO93/08545
PCT Pub. Date: Apr. 29, 1993

[30] Foreign Application Priority Data
Oct. 16, 1991 [GB] United Kingdom ............ 9121995

[51] Int. Cl.⁶ .................................... H04L 9/00
[52] U.S. Cl. .................................... 380/24; 380/4; 380/9; 380/21; 380/23; 380/25; 380/30; 380/49; 380/50; 235/379; 235/380
[58] Field of Search ............ 380/4, 9, 21, 30, 43, 380/49, 50, 23-25; 235/379, 380

[56] References Cited
U.S. PATENT DOCUMENTS

| | | | |
|---|---|---|---|
| 4,877,950 | 10/1989 | Halpern | 235/380 X |
| 4,906,828 | 3/1990 | Halpern | 235/379 |
| 4,935,962 | 6/1990 | Austin | 380/25 |
| 4,992,646 | 2/1991 | Collin | 235/379 X |
| 5,016,274 | 5/1991 | Micali et al. | 380/23 |
| 5,030,806 | 7/1991 | Collin | 235/380 X |

FOREIGN PATENT DOCUMENTS

| | | | |
|---|---|---|---|
| 0172670 | 2/1986 | European Pat. Off. | G07F 7/00 |
| 0256768 | 2/1988 | European Pat. Off. | G07F 7/10 |
| 0363122 | 4/1990 | European Pat. Off. | G07F 7/10 |
| 2066540 | 7/1981 | United Kingdom | G07F 7/10 |
| WO91/16691 | 10/1991 | WIPO | G07F 7/10 |

*Primary Examiner*—Bernarr E. Gregory
*Attorney, Agent, or Firm*—Wenderoth, Lind & Ponack

[57] ABSTRACT

A plurality of electronic purses communicate with each other to transfer values in transactions off-line from a main computer. A transfer message protocol of a transaction between electronic purses includes a commitment message to constitute a proof of posting. This allows interruption of a transaction before the value message itself is set. Escrow type payments and batch processing are facilitated.

26 Claims, 4 Drawing Sheets

VALUE TRANSFER SYSTEM

FIELD OF THE INVENTION

The invention relates to a value transfer system. Electronic value transfer systems have been proposed for transferring value between electronic "purses". These purses may take many forms but a convenient form is an integrated circuit (IC) card which includes a microprocessor and memories for at least accumulated value. Such cards may be used in so-called cashless transactions where value is transferred to a retailer "purse" in exchange for goods or services.

DESCRIPTION OF THE RELATED ART

Thus, a major application of such a system is to provide for the transfer of value equivalent to cash. Cash has both advantages and limitations. An advantage of cash is that small value individual transactions can be made without specific reconciliation between the payer and the payee accounts. Not only does this relieve the system of a considerable data transfer burden, but also anonymity is conferred in transactions. This is felt to be a social advantage. Many prior proposed electronic cashless value transfer systems have failed to recognize these advantages of cash and have failed to implement them. The system on which the present invention is based is described in published patent specification No. WO91/16691 and provides a framework for the transfer of value between electronic purses in such a way as to allow the aforesaid advantages of cash to be retained. The system may be summarized in that there is provided a computer; a plurality of electronic purses; exchange devices whereby purses may communicate with each other to transfer value in transactions which are off-line from the computer; draw-down means for loading purses with value under control of the computer; redemption means for redeeming value from purses under control of the computer; a value meter; one or more of said purses being bulk purses which are capable of having value loaded and redeemed via the value meter, the value meter recording one or more float value records whereby the net value released to the bulk purse or purses may be derived, the net value being the difference between the total of values drawn down to the bulk purse or purses and the total of values redeemed from the bulk purse or purses, the float value record being non-specific with regard to individual draw-downs and redemptions.

The value meter may have an interface whereby the float value record may be adjusted on command so as to create or destroy value within the bulk purse or purses.

Preferably there is provided, in each purse, storage means which stores a purse value record which is accumulative and, in each purse or associated exchange device, a microprocessor, transactions being conducted between purse pairs, one of which, the sending purse, sends value and the other of which, the receiving purse, receives value, the microprocessors being programmed so that in each off-line transaction the purse value record in the sending purse is decreased by a chosen and variable transaction value and the purse value record in the receiving purse is increased by the same transaction value.

By providing a float value record which is non-specific anonymity is ensured and reconciliation with customer accounts for all subsequent purse to purse transactions is unnecessary.

In some situations it is necessary to ensure that payment of funds or other value is contingent upon some subsequent event. For example, it may be desirable to transfer value on the basis only that such value is used for a specific purpose. Foreign exchange control may be the reason for this. For example, a government may wish to fund an importer on the basis that the funds can be applied only to designated goods.

Also, it may be desirable to use the value transfer system in a batch processing mode. The present invention seeks to provide an improvement whereby contingency and batch payments are possible.

SUMMARY OF THE INVENTION

According to the invention there is provided a value transfer system having a computer; a plurality of electronic purses; exchange devices whereby purses may communicate with each other to transfer value in transactions which are off-line from the computer; and, in each purse or associated exchange device, a microprocessor, transactions being conducted between purse pairs, one of which, the sending purse, sends value and the other of which, the receiving purse, receives value, the microprocessors being programmed so that each transaction includes at least the following steps:

A. The receiving purse sends a "request to receive value" message;
B. The sending purse creates a value message;
C. The sending purse creates and stores, a commitment message which signifies commitment of the requested value to the receiving purse;
D. The sending purse sends, between steps C and B, the commitment message; and
E. The sending purse sends the value message.

Preferably each purse has a store which is a log of transactions, the commitment message being stored in the log of the sending purse on creation and being stored in the log of the receiving purse on reception.

Before creating the commitment message the sending purse will have created the value message and subtracted the value required from its accumulator this sequence of events means that even if the transaction is terminated after creation of the commitment message it is ensured that the funds required are available in due course to the receiving purse and to that purse only. The same funds are no longer available to the sending purse. However, in order to complete the transaction the escrow amount must be transferred to the receiving purse. If necessary, this may be done by transfer in a series of transactions through one or more intermediaries who may be regarded as holding the funds subject to the contingency conditions being met.

Preferably the purses have means whereby a transaction between a pair of purses is given a unique identifier and the microprocessors are programmed to respond to the identifiers to prevent a given transaction from being repeated. No reference is then required to the computer to determine whether the same "electronic cash" is being used twice. In claiming to redeem value the computer is accessed and it will be possible to determine whether the same claim is being made twice, either directly or, since a claim may be simply another transaction, by means of a transaction identifier. The transaction identifier is preferably sent from the transmitting purse to the receiving purse, being conveniently derived from data identifying the receiving purse and a receiving purse transaction sequence number or electronic date/time stamp obtained from the receiving purse in a preliminary "hand-shaking" operation. In this way the receiving purse can monitor the transaction and any attempt to transmit the same value record twice will be foiled.

Security of the system demands that cryptographic techniques be employed to prevent fraud. The most effective cryptographic techniques are asymmetrical in that they require different keys to encrypt and decrypt information. The terms "encrypt" and "decrypt" will be used herein to mean "encypher" and "decypher". One well-known and suitable cryptographic technique is that attributed to Rivest, Shamir and Adleman, known as the RSA system. It is envisaged that both purses of a communicating pair may employ the RSA system equally in a balanced way for algorithmic processing. However, whereas RSA encryption is straightforward, relatively powerful computing facilities are required to execute RSA decryption conventionally in a short time. In order to overcome this difficulty, in the interests of economy and speed, it is proposed in accordance with a feature of the invention that an unbalanced system be used in which the processing capability required by consumer purses is significantly less than that required by retailer purses.

Each user of an asymmetrical key cryptographic system has a key pair, namely a public key and a secret key. Messages to another are encrypted using the other's (remote) public key which is made available, perhaps by as key exchange procedure. Received messages are decrypted using the local secret key. Use of a public key is far less demanding of computing power than use of a secret key so that conventionally encryption requires less computing overhead than decryption. Therefore, in implementing an unbalanced system of the kind described it is expedient to remove the requirement that the consumer purse performs conventional RSA decryption.

A first way of reducing the cryptographic burden in the consumer purse is to provide it with a simpler, symmetrical, cryptographic system. Such a system uses the same key for encryption and decryption. An example is the DES cryptographic system (Data Encryption Standard—U.S. FIPS 46,1976. Retailer purses retain the full power of the RSA system.

A second method is to use the consumer purse's own public key/secret key system for the interchange of data. In an exchange of keys the consumer purse sends its secret key to the retailer purse. In the transmission of data to the retailer purse the consumer purse would encrypt using its own public key and the retailer purse would decrypt using the consumer purse's secret key.

Security can be enhanced by using electronically certified data, for example digitally signed data, in the transaction process. Each purse on issue will be allocated a characteristic number and will have that number signed by the secret key of an asymmetrical global cryptographic system. The result will be a global signing of the number and this is stored in the purse. All purses will carry the public key of the global pair so that on receipt of another's globally signed number it will be possible to verify that it is valid. The numbers can be regarded as globally certified. Since transactions will require the exchange of encryption keys it is convenient, although not necessary, to arrange that the globally certified numbers are encryption keys to be exchanged.

BRIEF DESCRIPTION OF THE DRAWINGS

The invention will further be described with reference to the accompanying drawings, of which.

DESCRIPTION OF THE PREFERRED EMBODIMENTS

Figure 1:
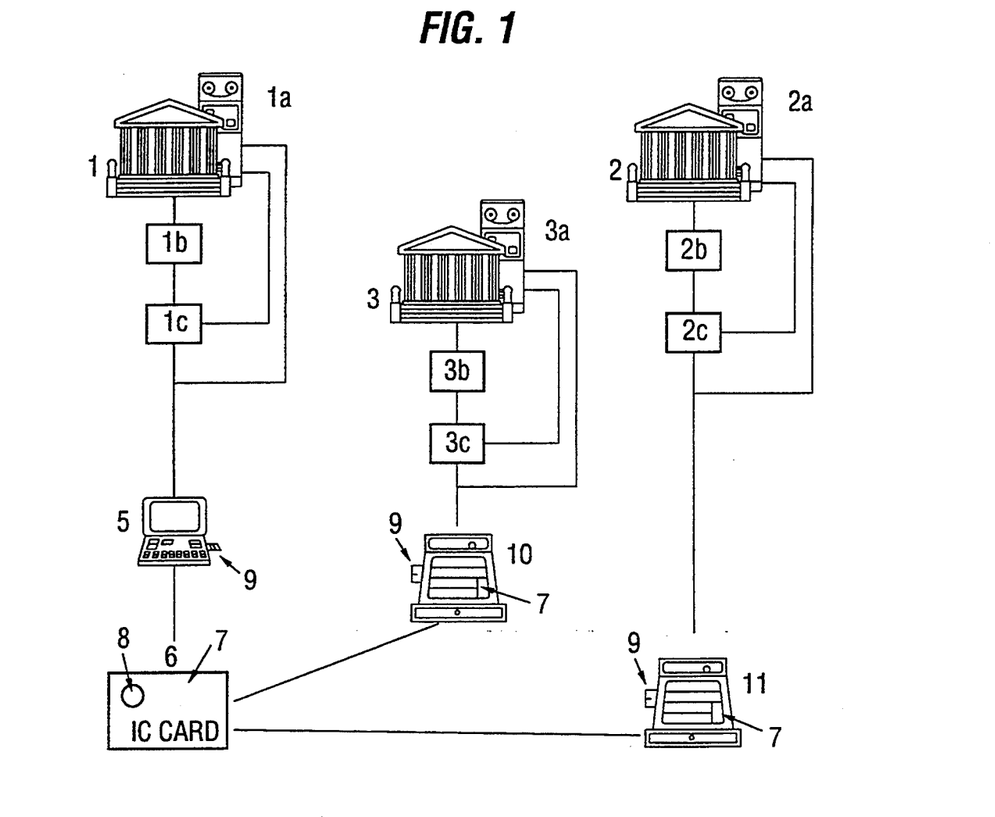
FIG. 1 is a schematic drawing of a banking computer system in accordance with the invention.

Referring to FIG. 1 there are shown three clearing banks 1, 2 and 3 with respective computers 1a, 2a and 3a. The computers have files containing account details of the banks' consumer and retailer customers. Each computer also has a value meter 1b, 2b, 3b which shows a float value record. The actual funds represented by the non-specific float value records may reside in one or more of banks 1, 2 or 3, or elsewhere.

Each bank has a bulk purse 1c, 2c, 3c which is connected to the respective value meter and which has a memory with a purse value record. Terminals 5 are connected by telephone selectively to computers 1, 2 and 3. Typically terminals 5 may be home computer terminals or terminals available in public places. Consumers have electronic purses in the form of IC cards 6. These cards have microprocessors and memories. In the memory of each card is stored a purse value record 7. The cards have contacts 8, whereby the cards can interact with terminals 5 via card readers 9. By making appropriate requests at the keyboard of the terminal, a consumer may be connected to the computer of his bank, 1, 2 or 3 and may request a value record to be loaded to his purse. If the bank authorizes the request, the bulk purse is instructed to institute a draw-down of value to load purse value record 7 with the value requested. The card is now ready for use.

Further electronic purses are contained in terminals 10, 11 which are equipped with IC card readers 9, located at different points-of-sale. To use his card the consumer presents it to the retailer where it is inserted into reader 9. The required value of the transaction is keyed in and by agreement the total held in the purse value record of the purse 6 is reduced by the amount of the transaction. The purse value record of the purse held within the terminal 10 or 11 is increased by the same transaction value. The consumer takes his goods and is free to use the card up to the total held in the purse value record of his purse in other retailers' equipment.

Periodically a retailer may redeem value represented by the purse value record held in the purse of his terminal 10 or 11, irrespective of the consumers' identities and without presenting any details of the individual transactions that have given rise to the total accumulated value. This may be done by connecting the terminal 10 or 11 to the retailer's bank 1, 2 or 3 as appropriate and requesting a redemption of value. The bank's computer then instructs a redemption transaction which accepts value from the terminal purse. The bank computer credits the retailer's account with funds. The value meters form the basis for allowing control of the total amount of value in circulation in all the purses and for apportioning, on an agreed basis, funds representing the total value.

Figure 2:
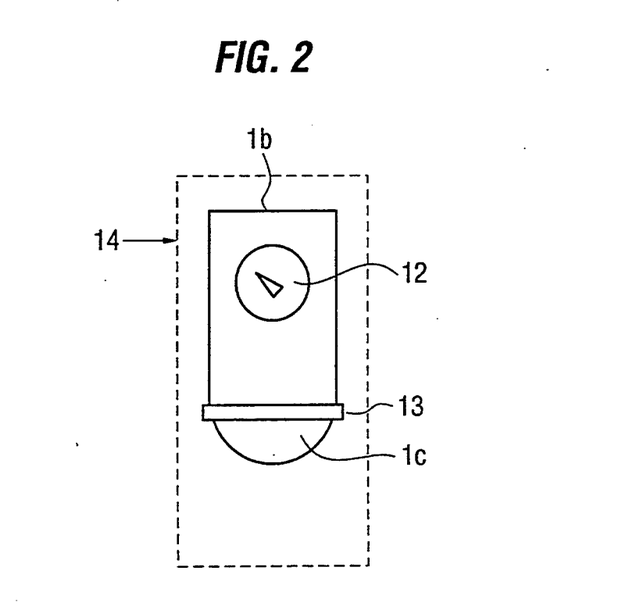
FIG. 2 is a diagram illustrating the value meter.

The bulk purses 1c, 2c, 3c differ from the other purses in being capable of having value loaded and redeemed via the value meter, as well as by purse to purse transactions. In all other respects the purses are technically similar, it being understood in particular that the same cryptographic techniques for bulk purse to other purse transactions (on-line) used are the same as for off-line transactions. FIG. 2 shows the value meter as including an indicator 12 which shows a float value record. This is, in this case, the net value released to the bulk purse 1c, being the difference between the total of values drawn down via the meter and the total of values redeemed via the meter. It will be appreciated that the individual gross draw-down and redeemed values may be indicated as well as or instead of the net value, it being readily possible to derive the net value from the gross values, even if not directly indicated. The link 13 between the value meter and that of each of its bulk purses is secure. The purse may be physically adjacent to the value meter and security ensured by physical locks etc. Alternatively, the bulk purse may be remote from the value meter and security is achieved by cryptographic techniques. It is important to ensure that the value meter always accurately represents the value released to the bulk purse and no fraudulent alteration can take place. Each value meter has an interface 14 which may be a link to the bank computing facility or a keyboard unit. Authorized personnel may enter values to be added to or subtracted from the float value record, representing a creation or destruction of value to be circulated. Thus, value to be circulated may be adjusted in bulk, perhaps daily, instead of on demand in response to individual draw-downs and claims.

Using the float value record in this way allows off-line interchange of value, given suitable terminals, between consumers and retailers, retailers and consumers and consumers and consumers, without the need to maintain large numbers of accounts or detailed account to account reconciliations.

Consumers themselves may adjust the purse value records in their purses by person to person interchange or by refunds etc. from retailers. It is envisaged that purse value records may be transferred to individual accounts by a claiming procedure from the float value record in a similar manner as retailers' claims.

Purses may be used on an international basis by loading different currencies in them. It is envisaged that each country or group of countries will hold a float value record in the appropriate currency. Application by a consumer to load his purse with a foreign currency may result in his domestic account being debited by the appropriate amount in his own currency and, the respective foreign currency float value record being increased.

A purse value record held in a purse may be converted to a different currency on request, the conversion being effected at the appropriate rate and resulting in a transfer of value from the float value record of one currency to that of another currency and a corresponding conversion of funds between the currencies.

Figure 3:
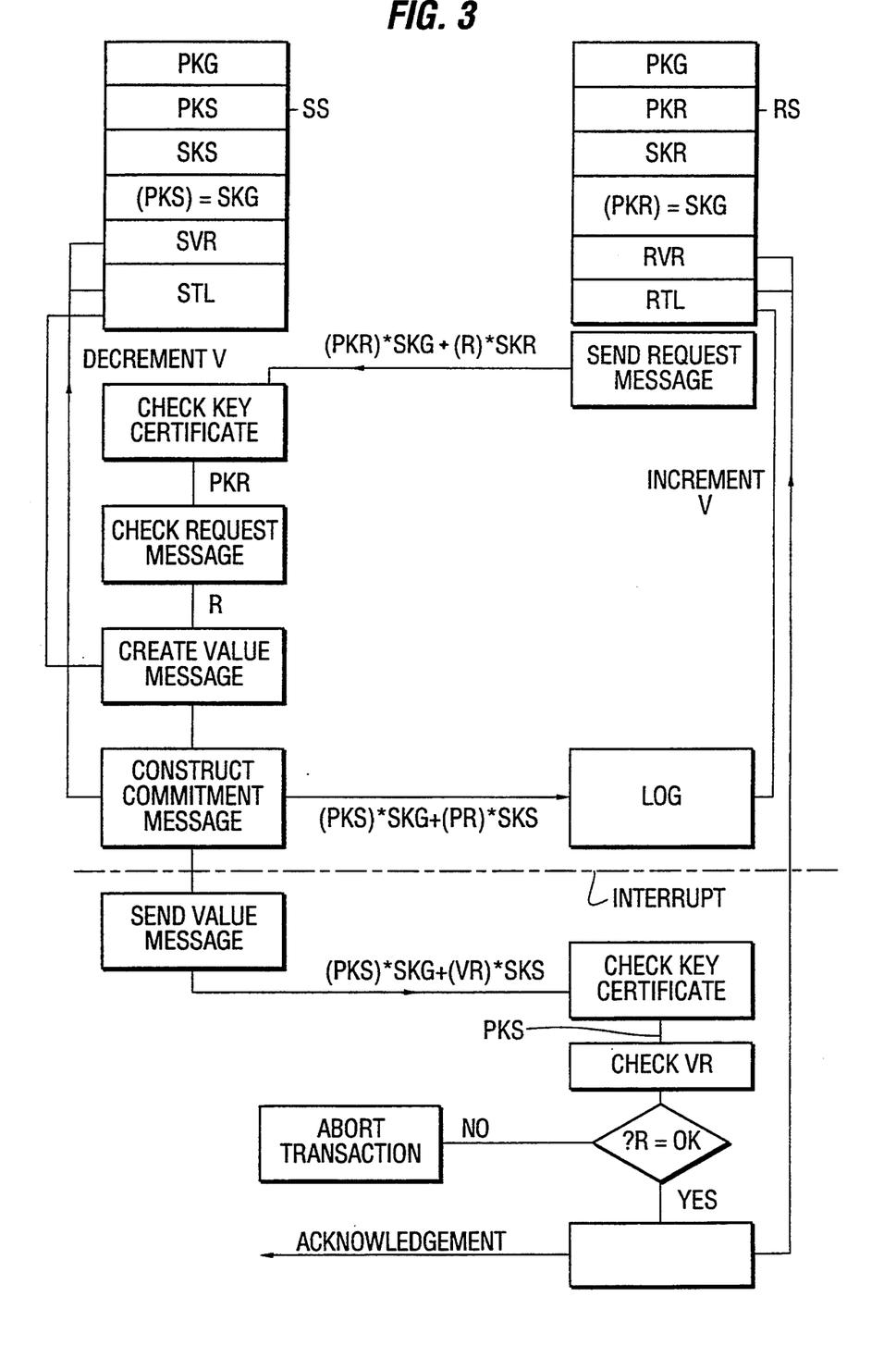
FIG. 3 is a diagram illustrating an example of a value transaction procedure using a full RSA cryptographic system.

FIG. 3 shows the procedure during an off-line transaction in a first embodiment of the invention. Both purses have full RSA asymmetrical cryptographic capability. The sending purse has a store SS which holds an accumulative value record Svr and the following RSA keys: sender public and secret keys Pks and Sks and global public key Pkg. In addition there is a certified data message [Pks]*Skg. This is the sender purse's unique public key signed by the master computer with its global secret key Skg. The public key Pks is thus electronically certified as valid by the system. The receiver purse has a store RS which holds an accumulative value record Rvr and the receiver purse's own RSA public and secret keys Pkr,Skr, the global public key Pkg and a certified public key data message [Pkr]*Skg.

The first step of the transaction procedure is for the receiving purse to issue a transaction identifier number R. This is derived from a combination of the receiving purse identity and a transaction sequence number for that purse. Two-way communication between the purses is established, perhaps locally by direct connection or by infra-red link or the like or remotely by modem and telephone. The following steps are followed:

1. The receiving purse transmits a request message which is [Pkr]*Skg+[R]*Skr.
2. The sending purse is able to check [Pkr]*Skg by use of the public global key Pkg. This gives the sending purse the authentic key Pkr to verify [R]*Skr and hence recover R.
3. The sending purse constructs a transaction value message VR from value V it wishes to transfer and from the request message R. This is signed with the sender's secret key to give the following transaction value message which is stored in the sending purse:

[Pks]*Skg+[VR]*Sks

4. The sending purse creates a commitment message of the form [Pks]*Skg+[PR]*Sks where P is a combination of a value V to be transferred and a signifier that the message is a commitment message.
5. The value V which is required to be transferred is decremented from the purse value record Svr.
6. Details of the commitment message are logged in the sending purse log STL.
7. The commitment message is sent to the receiving purse.
8. The receiving purse obtains the public key Pks by use of the public key Pkg thereby verifying the message [Pks]*Skg.
9. Use of the public key Pks thus found verifies [PR]*Sks and hence recovers PR.
10. R is checked to ensure that it carries the identity of the receiving purse and the appropriate transaction number. If not, the transaction is aborted.
11. The receiving purse logs the commitment message in its log RTL.
12. The sending purse transmits the transaction value message. This may be after an interruption in the transaction of any required duration.
13. The receiving purse obtains the public key Pks by use of the public key Pkg thereby verifying the message [Pks]*Skg.
14. Use of the public key Pks thus found verifies [VR]*Sks and hence recovers VR.
15. R is checked to ensure that it carries the identity of the receiving purse and the appropriate transaction number. If not, the transaction is aborted.

16. If all is well, the value V is added to the purse value record of the receiving purse.
17. A signed acknowledgement is sent to the sending purse.

Figure 4:
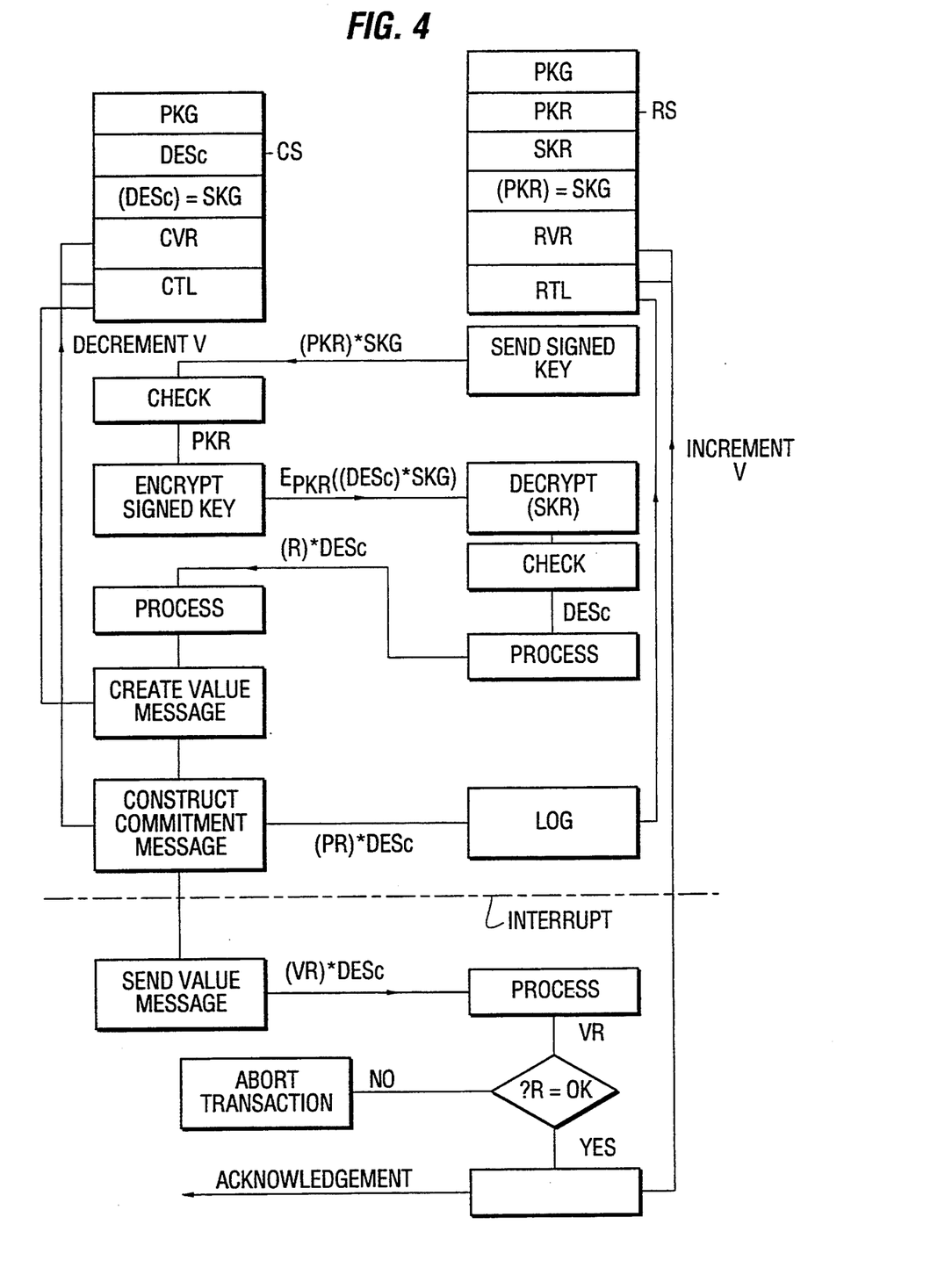
FIG. 4 is a diagram illustrating an example of a value transaction procedure using a secret key transmission technique.
Figure 5:
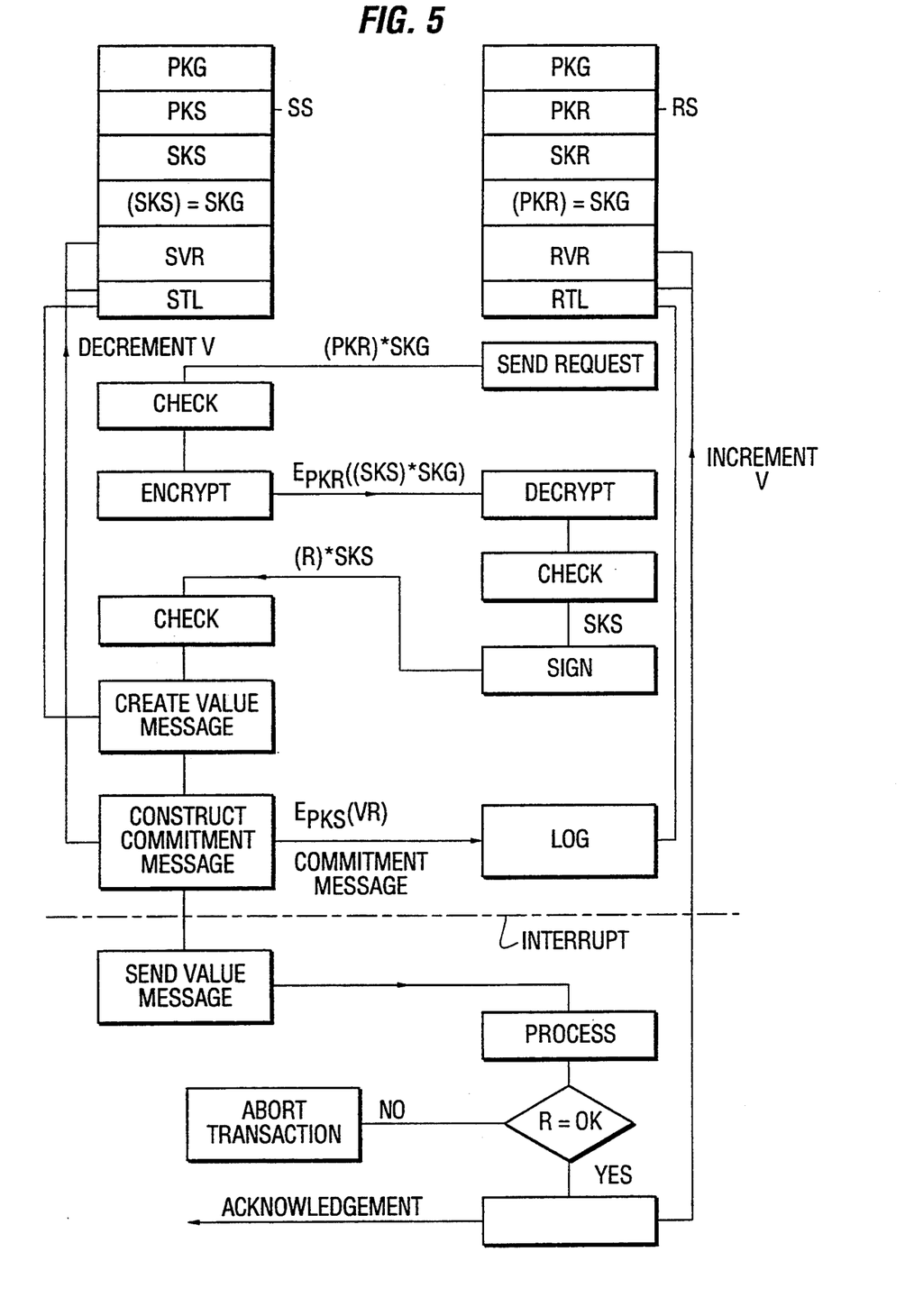
FIG. 5 is a diagram illustrating an example of a value transaction procedure using a mixed RSA/DES cryptographic system.

RSA encryption and decryption require calculation of the expression $x^y$ mod n where y is different for encryption and decryption. In particular the index y for encryption (embodied in the public key) is small and the corresponding index for decryption (embodied in the secret key) is very much larger. As a consequence, while modest computing power can handle encryption in an acceptably short time the same is not true for decryption. The creation of a certified (e.g. digitally signed) message has an equivalent processing overhead to decryption, the checking of such a message has an equivalent processing overhead to encryption. The embodiments illustrated in FIGS. 4 and 5 provide arrangements which allow one of the pair of communicating purses to be of lower computing power, and therefore less expensive, than the other. In these arrangements some purses of the system (retailer purses) have full RSA capability (encryption and decryption capability) whereas the remainder (consumer purses) include a symmetrical key cryptographic system for transmitting transaction value record messages. A suitable symmetrical key cryptographic system is the DES system. This requires for encryption and decryption a level of computing power similar to the power required for RSA encryption.

Referring to FIG. 4 there is illustrated the transaction procedure between two purses where the sending purse is a consumer purse and the receiving purse is a retailer purse. The retailer purse has full RSA capability whereas the consumer purse has a lower power computing facility. The sending purse has a store CS which holds an accumulative value record Cvr and the RSA global public key Pkg. In addition there is a DES key DESc and a certified data message [DESc]*Skg which is the sending purse's unique DES key signed by the master computer with its global secret key Skg. The receiving purse has a store SR which is identical with the store SR of the FIG. 3 embodiment, holding Pkr,Skr,Pkg and [Pkr]*Skg.

The first step in the transaction procedure is for the receiving purse to issue a transaction identifier R as in the embodiment of FIG. 3. Then the following steps are taken:
1. The receiving purse transmits its certified public key message [Pkr]*Skg.
2. The sending purse checks the signed message and derives Pkr.
3. The sending purse encrypts its certified message using Pkr. Since the index y of a public key such as Pkr is small, encryption with it is computationally easy. The message sent to the receiving purse is $E_{Pkr}$[[DESc]*Skg]

4. The receiving purse decrypts the message firstly with its secret key Skr to derive [DESc]*Skg which itself is checked with Pkg to give verification and derive DESc.
5. The receiving purse transmits the message [R]*DESc which is the transaction identifier R processed with a DES integrity algorithm.
6. The receiving purse decrypts the message in DES, derives the transaction identifier R and constructs the value message VR And the commitment message PR in the same way as in the FIG. 3 embodiment.
7. The sending purse decrements the value V from its purse value record and sends the message [PR]*DESc to the receiving purse. The commitment message is logged in STL.
8. The receiving purse decrypts [PR]*DES and checks that R is correct. If not the transaction is aborted.
9. If all is well the commitment message is stored in log RTL.
10. The sending purse constructs the value message VR and sends the value message [VR]*DESc to the receiving purse.
11. The receiving purse processes [VR]*DESc with a DES integrity algorithm and checks that R is correct. If not the transaction is aborted.
12. The value V is added to the receiving purse's purse value record and an acknowledgement message is sent to the sending purse.

Referring now to FIG. 5 there is shown a transaction procedure which allows the purses to have unbalanced computing power while using the keys of an asymmetrical cryptographic system. In FIG. 5 the store RS of the receiving purse has the same keys as in the FIG. 3 embodiment. The computing power of the sending purse is less than that of the receiving purse and instead of the signed public key, the sending purse holds an unsigned public key (which in this case is kept secret) and a signed secret key [Sks]*Skg (which also incorporates Pks). A transaction procedure has the following steps:
1. The receiving purse transmits the signed message [Pkr]*Skg.
2. The sending purse checks the signed message with Pkg, verifying [Pkr]*Skg and hence recovering Pkr.
3. The sending purse encrypts its signed message with Pkr and sends $E_{Pkr}$[[Sks]*Skg].
4. The receiving purse decrypts the message firstly with the use of its secret key Skr to give [Sks]*Skg and then uses the global public key Pkg to verify [Sks]*Skg, thereby recovering Sks.
5. The receiving purse signs the transaction identifier R with Sks and sends [R]*Sks.
6. The sending purse derives R by the use of Pks.
7. The sending purse constructs value message $E_{Pks}$[VR] and a commitment message $E_{Pks}$[PR]. The commitment message is logged in STL and is sent to the receiving purse.
8. The receiving purse decrypts the message with the use of Sks to derive P and R. R is checked and if it is incorrect the transaction is aborted.
9. The commitment message is logged in RTL.
10. The sending purse sends the value message $E_{Pks}$[VR].
11. The receiving purse decrypts the message with the use of Sks to derive V and R. R is checked and if it is incorrect the transaction is aborted.
12. If all is well the purse value record of the receiving purse is incremented by V, the key Sks in the receiving purse is discarded and an acknowledgement message is sent to the sending purse.

The commitment message can be regarded as a "proof of posting" message in the sense that it is proof that the value has been posted, in accountancy terms, from the account of the sending purse. Thus, "proof of posting" is proof that the value accumulator in the sending purse has been decremented by the required value.

Effectively, the commitment message tells the receiving purse that the required value has been irrevocably committed to it. The commitment, or "proof of posting" message takes the form of the value message except that a proof number P takes the place of value V. However, P contains the value information of V. Thus, the commitment message has the form [Pks]*Skg+[PR]*Sks. At the same time, details are logged in the sending purse log STL. On receipt of the commitment message the receiving purse enters the details in the log RTL.

By virtue of the logs it is possible to recover financially intact from any transaction which has been interrupted either accidentally or deliberately. In the event of a dispute about the allocation of funds between purses for whatever reason, the purses can be examined and the dispute resolved on the basis of the log information. The transaction may be broken at any time after the value and commitment messages have been created and logged.

When the value and commitment messages have been logged, it is possible to interrupt the transaction. This is illustrated, for example, by the broken line marked "Interrupt". Interruption at this stage is useful for contingency payments since the receiving purse will have received confirmation that the required funds are committed to it but will not have received the funds at that time. On satisfaction of the contingency requirements the transaction can be resumed by the sending purse transmitting the value message in the manner described before. The actual transmission and receipt of the value message are logged by the respective purses and the transaction is completed. It is not necessary that the value message should be transmitted directly from sending purse to receiving purse and various intermediate transactions can be envisaged whereby the value, which can be regarded as being held in escrow, is transferred to intermediate purses. These purses will not have access to the funds represented by the escrow message which will be destined for and usable by the receiving purse only.

An advantage of interrupted processing of a transaction is that it allows transactions to be batch processed in their suspended state. This, in turn, renders the system applicable to batch processing procedures.

The invention is not restricted to the details of the embodiments described above with reference to the drawings. For example, the method of sending and receiving cryptographic keys described may be replaced by a preliminary "exchange of keys" protocol step.

We claim:

1. A value transfer system comprising:
   a computer;
   a plurality of electronic purses;
   exchange devices associated with the electronic purses through which the purses communicate with each other to transfer value in transactions which are off-line from the computer; and,
   microprocessors respectively contained in the electronic purses or associated exchange devices, said microprocessors being programmed to effect transactions between a pair of purses including a sending purse which sends value and a receiving purse which receives value, wherein each transaction includes at least the microprocessor implemented processes of (a) the receiving purse or an exchange device associated with the receiving purse sending a requested value message denoting a request to receive value, (b) the sending purse or the exchange device associated with the sending purse creating a value message responsive to the requested value message sent by the receiving purse or the exchange device associated with the receiving purse, (c) the sending purse or the exchange device associated with the sending purse creating and storing a commitment message which signifies commitment of the value requested by the request value message sent by the receiving purse or the exchange device associated with the receiving purse, (d) the sending purse or the exchange device associated with the sending purse sending the commitment message to the receiving purse or the exchange device associated with the receiving purse, (e) the sending purse or the exchange device associated with the sending purse sending the value message to the receiving purse or the exchange device associated with the receiving purse, and (f) the receiving purse or the exchange device associated with the receiving purse receiving and processing the value message.

2. A value transfer system as claimed in claim 1, wherein each purse has a store which is a log of transactions, the commitment message being stored in the log of the sending purse upon creation and being stored in the log of the receiving purse upon reception.

3. A value transfer system as claimed in claim 2, wherein the microprocessors are programmed to provide each transaction a unique identifier R specific to the receiving purse, wherein the requested value message includes the transaction identifier R, wherein the value message includes information VR including a value V to be transferred and the transaction identifier R, and wherein the commitment message includes information PR where P includes the value V and a signifier which signifies the message as a commitment message.

4. A value transfer system as claimed in claim 3, wherein the microprocessors are programmed to employ an asymmetrical cryptographic system having different public and secret keys and each purse has stored therein at least a public key of the system.

5. A value transfer system as claimed in claim 4, wherein each purse stores data signed in the cryptographic system by the computer with a global secret encryption key, the signed data thereby being electronically certified, and the microprocessors are programmed to effect each transaction by checking certified purse data using the global public key.

6. A value transfer system as claimed in claim 5, wherein a transaction a first microprocessor of one of the receiving purse and the sending purse has superior computing power compared to that microprocessor of the other of the receiving purse and the sending purse, wherein the purse of the second microprocessor includes an encryption key for a symmetrical cryptographic system and the first and second microprocessors are programmed to effect the transaction by sending to the purse of the first microprocessor the encryption key of the purse of the second microprocessor and encrypting data at the purse of the second microprocessor using the encryption key.

7. A value transfer system as claimed in claim 4, wherein each purse has stored therein a unique key pair including a public key and a secret key in the cryptographic system and the microprocessors are programmed to effect transmission of transaction data as encrypted and decrypted data using the key pairs.

8. A value transfer system as claimed in claim 7, in which in a transaction a first microprocessor of one of the receiving purse and the sending purse has superior computing power compared to that of a second microprocessor of the other of the receiving purse and the sending purse, and the first and second microprocessors are programmed to effect the transaction by sending to the purse of the first microprocessor the secret key of the key pair of the purse of the second microprocessor and encrypting data at the purse of the second microprocessor using the public key of the key pair of the purse of the second microprocessor.

9. A value transfer system as claimed in claim 2, wherein the microprocessors are programmed to employ an asymmetrical cryptographic system having different public and secret keys and each purse has stored therein at least a public key of the system.

10. A value transfer system as claimed in claim 9, wherein each purse stores data signed in the cryptographic system by the computer with a global secret encryption key, the signed data thereby being electronically certified, and the microprocessors are programmed to effect each transaction by of checking certified purse data using the global public key.

11. A value transfer system as claimed in claim 10, wherein a transaction a first microprocessor of one of the receiving purse and the sending purse has superior computing power compared to that microprocessor of the other of the receiving purse and the sending purse, wherein the purse of the second microprocessor includes an encryption key for a symmetrical cryptographic system and the first and second microprocessors are programmed to effect the transaction by sending to the purse of the first microprocessor the encryption key of the purse of the second microprocessor and encrypting data at the purse of the second microprocessor using the encryption key.

12. A value transfer system as claimed in claim 9, wherein each purse has stored therein a unique key pair including a public key and a secret key in the cryptographic system and the microprocessors are programmed to effect transmission of transaction data as encrypted and decrypted data using the key pairs.

13. A value transfer system as claimed in claim 12, in which in a transaction a first microprocessor of one of the receiving purse and the sending purse has superior computing power compared to that of a second microprocessor of the other of the receiving purse and the sending purse, and the first and second microprocessors are programmed to effect the transaction by sending to the purse of the first microprocessor the secret key of the key pair of the purse of the second microprocessor and encrypting data at the purse of the second microprocessor using the public key of the key pair of the purse of the second microprocessor.

14. A value transfer system as claimed in claim 1, wherein the microprocessors are programmed to provide each transaction a unique identifier R specific to the receiving purse, wherein the requested value message includes the transaction identifier R, wherein the value message includes information VR including a value V to be transferred and the transaction identifier R, and wherein the commitment message includes information PR where P includes the value V and a signifier which signifies the message as a commitment message.

15. A value transfer system as claimed in claim 14, wherein the microprocessors are programmed to employ an asymmetrical cryptographic system having different public and secret keys and each purse has stored therein at least a public key of the system.

16. A value transfer system as claimed in claim 15, wherein each purse stores data signed in the cryptographic system by the computer with a global secret encryption key, the signed data thereby being electronically certified, and the microprocessors are programmed to effect each transaction by checking certified purse data using the global public key.

17. A value transfer system as claimed in claim 16, wherein a transaction a first microprocessor of one of the receiving purse and the sending purse has superior computing power compared to that microprocessor of the other of the receiving purse and the sending purse, wherein the purse of the second microprocessor includes an encryption key for a symmetrical cryptographic system and the first and second microprocessors are programmed to effect the transaction by sending to the purse of the first microprocessor the encryption key of the purse of the second microprocessor and encrypting data at the purse of the second microprocessor using the encryption key.

18. A value transfer system as claimed in claim 15, wherein each purse has stored therein a unique key pair including a public key and a secret key in the cryptographic system and the microprocessors are programmed to effect transmission of transaction data as encrypted and decrypted data using the key pairs.

19. A value transfer system as claimed in claim 18, in which in a transaction a first microprocessor of one of the receiving purse and the sending purse has superior computing power compared to that of a second microprocessor of the other of the receiving purse and the sending purse, and the first and second microprocessors are programmed to effect the transaction by sending to the purse of the first microprocessor the secret key of the key pair of the purse of the second microprocessor and encrypting data at the purse of the second microprocessor using the public key of the key pair of the purse of the second microprocessor.

20. A value transfer system as claimed in claim 1, wherein the microprocessors are programmed to employ an asymmetrical cryptographic system having different public and secret keys and each purse has stored therein at least a public key of the system.

21. A value transfer system as claimed in claim 20, wherein each purse stores data signed in the cryptographic system by the computer with a global secret encryption key, the signed data thereby being electronically certified, and the microprocessors are programmed to effect each transaction by checking certified purse data using the global public key.

22. A value transfer system as claimed in claim 20, wherein each purse has stored therein a unique pair including a public key and a secret key in the cryptographic system and the microprocessors are programmed to effect transmission of transaction data as encrypted and decrypted data using the key pairs.

23. A value transfer system as claimed in claim 22, in which in a transaction a first microprocessor of one of the receiving purse and the sending purse has superior computing power compared to that of a second microprocessor of the other of the receiving purse and the sending purse, and the first and second microprocessors are programmed to effect the transaction by sending to the purse of the first microprocessor the secret key of the key pair of the purse of the second microprocessor and encrypting data at the purse of the second microprocessor using the public key of the key pair of the purse of the second microprocessor.

24. A value transfer system as claimed in claim 20, wherein in a transaction a first microprocessor of one of the receiving purse and the sending purse has superior computing power compared to that a second microprocessor of the other of the receiving purse and the sending purse, wherein the purse of the second microprocessor includes an encryption key for a symmetrical cryptographic system and the first and second microprocessors are programmed to effect the transaction by sending to the purse of the first microprocessor the encryption key of the purse of the second microprocessor and encrypting data at the purse of the second microprocessor using the encryption key.

25. A value transfer system as claimed in claim 20, wherein each purse has stored therein a unique pair including a public key and a secret key in the cryptographic system and the microprocessors are programmed to effect transmission of transaction data as encrypted and decrypted data using the key pairs.

26. A value transfer system as claimed in claim 25, in which in a transaction a first microprocessor of one of the receiving purse and the sending purse has superior computing power compared to that of a second microprocessor of the other of the receiving purse and the sending purse, and the first and second microprocessors are programmed to effect the transaction by sending to the purse of the first microprocessor the secret key of the key pair of the purse of the second microprocessor and encrypting data at the purse of the second microprocessor using the public key of the key pair of the purse of the second microprocessor.

* * * * *